US012646290B2

(12) United States Patent
Babiloni et al.

(10) Patent No.: US 12,646,290 B2
(45) Date of Patent: Jun. 2, 2026

(54) POLYNOMIAL SELF-ATTENTION

(71) Applicant: HUAWEI TECHNOLOGIES CO., LTD., Shenzhen (CN)

(72) Inventors: Francesca Babiloni, London (GB); Ioannis Marras, London (GB); Jiankang Deng, London (GB); Stefanos Zafeiriou, London (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 349 days.

(21) Appl. No.: 18/460,319

(22) Filed: Sep. 1, 2023

(65) Prior Publication Data

US 2023/0410475 A1 Dec. 21, 2023

Related U.S. Application Data

(63) Continuation of application No. PCT/EP2021/056617, filed on Mar. 16, 2021.

(51) Int. Cl.
| | |
|---|---|
| *G06V 10/00* | (2022.01) |
| *G06V 10/56* | (2022.01) |
| *G06V 10/764* | (2022.01) |
| *G06V 10/774* | (2022.01) |
| (Continued) | |

(52) U.S. Cl.
CPC ............ *G06V 10/764* (2022.01); *G06V 10/56* (2022.01); *G06V 10/7747* (2022.01); *G06V 10/776* (2022.01); *G06V 10/82* (2022.01)

(58) Field of Classification Search
CPC .... G06V 10/82; G06V 10/761; G06V 10/762; G06V 10/764; G06V 10/765; G06V 10/7715; G06V 10/25; G06V 10/7747; G06V 10/56; G06V 10/776; G06N 20/00; G06N 20/10; G06N 20/20; G06F 18/24133
See application file for complete search history.

(56) References Cited

U.S. PATENT DOCUMENTS

| | | | | |
|---|---|---|---|---|
| 10,963,754 B1 * | 3/2021 | Ravichandran | ...... | G06V 10/761 |
| 11,308,353 B2 * | 4/2022 | Singh | ................... | G06N 3/0464 |
| 11,348,249 B2 * | 5/2022 | Jie | ......................... | G06V 10/82 |

(Continued)

OTHER PUBLICATIONS

Nikitaev et al., "RU2385494C1 Method for recognition of cell texture image"; Publication Date: Mar. 27, 2010.*

(Continued)

*Primary Examiner* — Amir Alavi
(74) *Attorney, Agent, or Firm* — Leydig, Voit & Mayer, Ltd.

(57) ABSTRACT

A classification apparatus for allocating a raw image to a respective class out of a plurality of classes, the apparatus comprising one or more processors and a memory storing in non-transient form data defining program code executable by the one or more processors to implement an image classification model, the apparatus being configured to: receive a raw image; generate a plurality of raw matrices from the raw image, wherein each of the plurality of raw matrices is formed by one spatial value and one characteristic value; and allocate the raw image to the respective class depending on the plurality of raw matrices. By forming each of the raw matrices by one spatial value and one characteristic value the computational cost may be reduced.

20 Claims, 12 Drawing Sheets

(51) Int. Cl.
    *G06V 10/776*     (2022.01)
    *G06V 10/82*     (2022.01)

(56) References Cited

U.S. PATENT DOCUMENTS

| | | | | |
|---|---|---|---|---|
| 11,954,572 | B2 * | 4/2024 | Hagen | G06N 3/08 |
| 12,198,405 | B2 * | 1/2025 | He | G06V 10/764 |
| 12,314,343 | B2 * | 5/2025 | Huang | G06V 10/95 |
| 12,380,682 | B2 * | 8/2025 | Nagori | G06V 10/82 |
| 2019/0156210 | A1 | 5/2019 | He et al. | |
| 2020/0388033 | A1 * | 12/2020 | Matlock | G06V 10/774 |
| 2021/0211360 | A1 * | 7/2021 | Ramlall | H04L 61/2503 |
| 2023/0410475 | A1 * | 12/2023 | Babiloni | G06V 10/25 |

OTHER PUBLICATIONS

Choromanski et al., "Rethinking Attention with Performers," arXiv:2009. 14794v1 [cs.LG], total 36 pages (Sep. 30, 2020).

Katharopoulos et al., "Transformers are RNNs: Fast Autoregressive Transformers with Linear Attention," arXiv:2006.16236v3 [cs.LG], total 17 pages (Aug. 31, 2020).

Wang et al., "Linformer: Self-Attention with Linear Complexity," arXiv:2006.04768v3 [cs.LG], total 12 pages (Jun. 14, 2020).

Vaswani et al., "Attention Is All You Need," arXiv: 1706.03762v5 [cs.CL], total 15 pages (Dec. 6, 2017).

Tay et al., "Efficient Transformers: A Survey," arXiv:2009.06732v2 [cs.LG], total 28 pages (Sep. 16, 2020).

Chrysos et al., "Π-nets: Deep Polynomial Neural Networks," arXiv:2003. 03828v2 [cs.LG], total 11 pages (Mar. 26, 2020).

Ronneberger et al., "U-Net: Convolutional Networks for Biomedical Image Segmentation," arXiv: 1505.04597v1 [cs.CV], total 8 pages (May 18, 2015).

Babiloni et al., "TESA: Tensor Element Self-Attention via Matricization," 2020 IEEE/CVF Conference on Computer Vision and Pattern Recognition (CVPR), XP055865626, total 10 pages, Institute of Electrical and Electronics Engineers, New York, New York (Jun. 1, 2020).

Dabov et al., "Image Denoising by Sparse 3-D Transform-Domain Collaborative Filtering," IEEE Transactions on Image Processing, vol. 16, No. 8, total 17 pages, Institute of Electrical and Electronics Engineers, New York, New York (Aug. 2007).

Wang et al., "Non-local Neural Networks," 2018 IEEE/CVF Conference on Computer Vision and Pattern Recognition, total 10 pages, Institute of Electrical and Electronics Engineers, New York, New York (Jun. 2018).

\* cited by examiner

800

801 — Receive a raw image

802 — Generate a plurality of raw matrices from the raw image, each of the plurality of raw matrices is formed by one spatial value and one characteristic value 803 — Allocate the raw image to the respective class depending on the plurality of raw matrices 901        902

900

1301                                    1302

POLYNOMIAL SELF-ATTENTION

CROSS-REFERENCE TO RELATED APPLICATIONS

This application is a continuation of International Application No. PCT/EP2021/056617, filed on Mar. 16, 2021, the disclosure of which is hereby incorporated by reference in its entirety.

TECHNICAL FIELD

This disclosure relates to image classification in self-attention neural networks.

BACKGROUND

Capturing better information regarding the self-similarity of an input tensor can benefit a variety of computer vision problems ranging from image restoration to classification.

Tensors can be used as an abstract representation of a data input. In particular, the tensor can represent complex structures. These structures may include images and videos in relation to computer vision, to corpora of text in relation to natural language processing, to gene expressions in relation to bioinformatics.

The tensor can correspond to a matrix. The dimension of the tensor is referred to as the rank D. The rank of a tensor is n-1 of the dimension of the corresponding matrix. For example, a 0-D rank tensor corresponds to a number of scalar, a 1-D rank tensor corresponds to a vector, a 2-D rank tensor corresponds to a matrix and so on.

Convolutional neural networks (CNNs) can use tensors to encode or represent input images.

A self-attention mechanism is a mechanism that can capture or analyse interconnections, or dependences, between two data inputs. For example, between two similar, or dissimilar, images. The self-attention mechanism may use a similarity function, which is a real-valued function, to quantify the similarity between the two data inputs. Although there is no single definition of similarity, the similarity is usually measured in using an inverse of distance metric. For example, very similar images will produce a high value and very dissimilar images will produce a near zero or negative value.

It is known to take advantage of self-similarity data input for use in traditional image processing, such as in computer vision. For example, in Dabov, Kostadin et al. ("*Image denoising by sparse 3D transform-domain collaborative filtering*" IEEE Transactions on Image Processing. 16 (8): 2007) the similarity between pairs of patches in the raw and truth input images is used for denoising.

In Wang, X., Girshick, R., Gupta, A., & He, K. ((2018). Non-local neural networks. In *Proceedings of the IEEE Conference on Computer Vision and Pattern Recognition* (pp. 7794-7803)), a CNN is used for image classification. Here, deep learning methods extract an abstract representation of the input image, obtained by stacking multiple convolutional layers together. However, one inherent disadvantage of these methods is the necessity, due to limited computational power, to process each input point only as a function of its neighbouring region. This is because the method uses a pairwise function to capture the input spatial interdependencies which may increase the computational cost. The result of this is that this method may be unable to take account of long-range dependencies in the data input in real time. This may be disadvantageous for image classification as the combination of features across the image might be beneficial to classify the image correctly.

It is desirable to develop a method that overcomes the above problems.

SUMMARY

According to a first aspect there is provided a classification apparatus for allocating a raw image to a respective class out of a plurality of classes, the apparatus comprising one or more processors and a memory storing in non-transient form data defining program code executable by the one or more processors to implement an image classification model, the apparatus being configured to: receive a raw image; generate a plurality of raw matrices from the raw image, wherein each of the plurality of raw matrices is formed by one spatial value and one characteristic value; and allocate the raw image to the respective class depending on the plurality of raw matrices.

By forming the plurality of raw matrices by one spatial value and one characteristic value, this may reduce the computational cost of running the apparatus by enabling element-wise multiplication instead of matrix multiplication. The result of this is that this method may be able to take account of long-range dependencies in the data input in real time. This may be advantageous for image classification as the combination of features across the image might be beneficial to classify the image correctly.

In some implementations, the apparatus may be configured to before generating the plurality of raw matrices, generate a plurality of raw tensors from the raw image, wherein each of the plurality of raw tensors comprising two or more spatial values and one characteristic value; and unfold each of the plurality of raw tensors to generate the plurality of raw matrices.

By unfolding the raw tensors, which comprise two or more spatial values, into a matrix, which comprises one spatial value, this may enable the image allocation apparatus to convert the raw image into a form that may be easier for the allocation to take place. Additionally, reducing the spatial values from two to one value may also enable the reduced computational cost as described above.

In some implementations, the apparatus may be configured to allocate the raw image to the respective class depending on the plurality of raw matrices by comparing the raw matrices with the image classification model and allocate the raw image to the respective class depending on that comparison.

By comparing the raw matrices with the image classification model, this may enable the apparatus to take account of the difference between the raw matrices and the image classification model when allocating the raw image.

In some implementations, the apparatus may be configured to compare the raw matrices with the image classification model by comparing the error difference between the raw matrices and the image classification model and allocating the raw image to the respective class depending on that comparison.

By comparing the raw matrices with the image classification model using an error difference, this may provide a metric for basing the allocation of the raw image on.

In some implementations, the apparatus may be configured to compare the raw matrices with the image classification model by a convolutional neural network.

By using a convolutional neural network to compare the raw matrices with the image classification model, the convolution kernels may provide an improved comparison and take account of more features in the data.

In some implementations, the apparatus may be configured to compare the raw matrices with the image classification model by a self-attention weighting operation.

By using self-attention weighting to compare the raw matrices with the image classification model, the weighting may weight certain features more than others. The more important features for classification may be more heavily weighted which may improve the image allocation.

In some implementations, the apparatus may be configured to compare the raw matrices with the image classification model by an average pooling down-sampling operation.

By using average pooling down-sampling to compare the raw matrices with the image classification model, the average of the data sets is used to compare the data. This may improve the image allocation apparatus as all of the data may be evenly accounted for.

In some implementations, the apparatus may be configured to compare the raw matrices with the image classification model by a max pooling down-sampling operation.

By using max pooling down-sampling to compare the raw matrices with the image classification model, the maximum of the data sets is used to compare the data. This may improve the image allocation apparatus as the more significant data may be used to compare.

In some implementations, the apparatus may be configured so that the spatial values in the matrices represent a coordinate position of the image.

By representing the coordinate position of the image using spatial values in the matrices, this may provide an easily understandable data input for the allocation apparatus to use.

In some implementations, the apparatus may be configured so that the characteristic values represent a colour value of the image.

By representing the colour value of the image using characteristic values in the matrices, this may provide an easily understandable data input for the allocation apparatus to use.

According to a second aspect there is provided a method for allocating a raw image to a respective class out of a plurality of classes, the method comprising: receiving a raw image; generating a plurality of raw matrices from the raw image, wherein each of the plurality of raw matrices is formed by one spatial value and one characteristic value; and allocating the raw image the respective class depending on the plurality of raw matrices.

By forming the plurality of raw matrices by one spatial value and one characteristic value, this may reduce the computational cost of running the apparatus by enabling element-wise multiplication instead of matrix multiplication. The result of this is that this method may be able to take account of long-range dependencies in the data input in real time. This may be advantageous for image classification as the combination of features across the image might be beneficial to classify the image correctly.

According to a third aspect there is provided an apparatus for training an image classification model, the apparatus comprising one or more processors configured to: receive a training image; generate a plurality of training matrices from the training image, wherein each of the plurality of training matrices is formed of one spatial value and one characteristic value; and adapt the image classification model in dependence on the plurality of training matrices.

By forming the plurality of training matrices by one spatial value and one characteristic value, this may reduce the computational cost of running the apparatus by enabling element-wise multiplication instead of matrix multiplication. The result of this is that this method may be able to take account of long-range dependencies in the data input in real time. This may be advantageous for image classification as the combination of features across the image might be beneficial to classify the image correctly.

In some implementations, the apparatus may be configured to: before generating the plurality of training matrices, generate a plurality of training tensors from the training image, the plurality of training tensors each comprising two or more spatial values and one characteristic value; and unfold each of the plurality of training tensors to generate the plurality of training matrices.

By unfolding the training tensors, which comprise two or more spatial values, into a matrix, which comprises one spatial value, this may enable the image classification training apparatus to convert the training image into a form that may be easier for the classification training to take place. Additionally, reducing the spatial values from two to one value may also enable the reduced computational cost as described above.

In some implementations, the apparatus may be configured to: before adapting the image classification model, receive a truth image corresponding to the training image; and generate a plurality of truth matrices from the truth image, the plurality of truth matrices having only one spatial value and one characteristic value.

By forming the plurality of truth matrices by one spatial value and one characteristic value, this may reduce the computational cost of running the apparatus by enabling element-wise multiplication instead of matrix multiplication. The result of this is that this method may be able to take account of long-range dependencies in the data input in real time. This may be advantageous for image classification as the combination of features across the image might be beneficial to classify the image correctly.

In some implementations, the apparatus may be configured to: before generating the plurality of truth matrices, generate a plurality of truth tensors from the truth image, the plurality of truth tensors each comprising two or more spatial values and one characteristic value; and unfold each of the plurality of truth tensors to generate the plurality of truth matrices.

By unfolding the truth tensors, which comprise two or more spatial values, into a matrix, which comprises one spatial value, this may enable the image classification training apparatus to convert the truth image into a form that may be easier for the classification training to take place. Additionally, reducing the spatial values from two to one value may also enable the reduced computational cost as described above.

In some implementations, the apparatus may be configured to adapt the image classification model in dependence on the plurality of training matrices by comparing the training matrices with the truth matrices and adapting the image classification model in dependence on that comparison.

By comparing the training matrices with the truth matrices, this may enable the apparatus to take account of the difference between the training matrices and the truth matrices when training the image classification model.

In some implementations, the apparatus may be configured to; carry out the steps above for one or more subsequent training images, each of the one or more subsequent training images constituting an input for a subsequent training iteration.

In some implementations, the apparatus may be configured to; carry out the steps above for one or more subsequent truth images, the truth image(s) corresponding to the training image(s), the one or more subsequent truth images provide a subsequent truth iteration.

By carrying out the steps for subsequent training and truth images, the image classification model may develop and improve over each iteration. Over the iterations the model may tend to an optimum.

In some implementations, the apparatus may be configured to provide one or more input conditions of a subsequent iteration, the one or more input conditions are dependent on the difference between the preceding training matrices and the preceding truth matrices.

By using the difference between the preceding training matrices and the preceding truth matrices to set the input conditions of a subsequent iteration, the image classification training apparatus may learn from the previous iteration how to improve the subsequent iteration.

According to a fourth aspect there is provided a method for training an image classification model, the method comprising: receiving a training image; generating a plurality of training matrices from the training image, wherein each of the plurality of training matrices is formed of one spatial value and one characteristic value; and adapting the image classification model in dependence on the plurality of training matrices.

By forming the plurality of training matrices by one spatial value and one characteristic value, this may reduce the computational cost of running the apparatus by enabling element-wise multiplication instead of matrix multiplication. The result of this is that this method may be able to take account of long-range dependencies in the data input in real time. This may be advantageous for image classification as the combination of features across the image might be beneficial to classify the image correctly.

According to a fifth aspect there is provided an image processing apparatus comprising an image classification apparatus as above, the image processing apparatus being configured to transform a raw image in dependence on a class to which the image classification apparatus has allocated the raw image.

By transforming the raw image in dependence on the class into which the raw image is allocated, the transformation performed may be tailored, or suited, to the particular class of image.

BRIEF DESCRIPTION OF THE DRAWINGS

The present disclosure will now be described by way of example with reference to the accompanying drawings. In the drawings.

DETAILED DESCRIPTION

The apparatuses and methods described herein concern using an image classification model to allocate raw images and training said image classification model.

Embodiments of the present system may tackle one or more of the problems previously mentioned by introducing raw matrices which have only one spatial value and one characteristic value. In this way, it is possible to reduce the computational cost of the model and consequently enable the model to take account of long-range dependencies in the data input.

Figure 1:
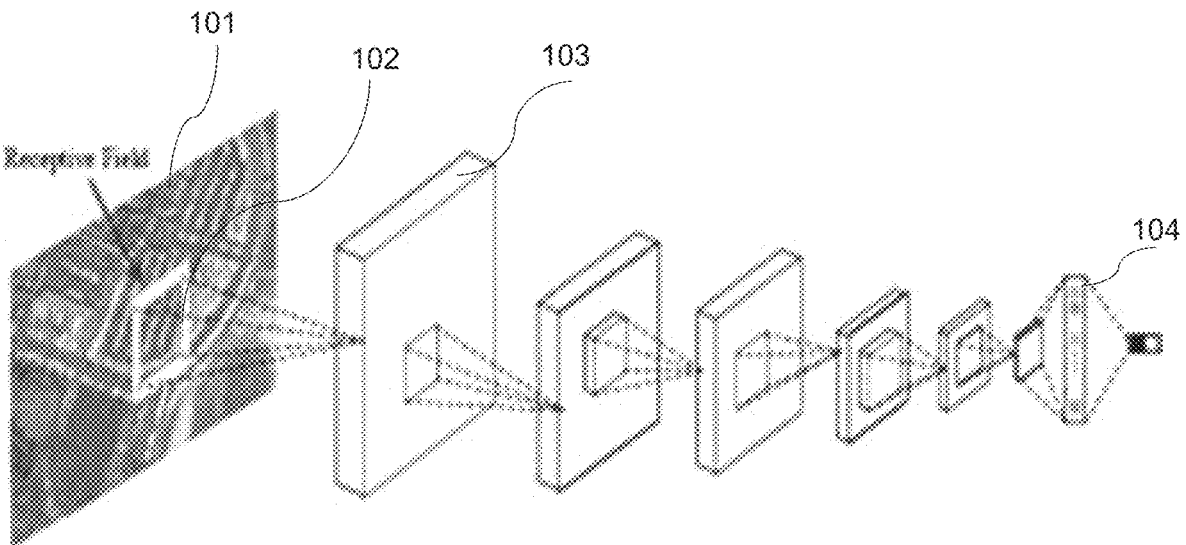
FIG. 1 schematically illustrates a convolution neural network process for tensor image representation.

FIG. 1 shows an example convolutional neural network (CNN) into which an image 101 is input. CNNs having this structure are known from the prior art and may be used in embodiments of the present disclosure. The CNN takes a patch 102 of the input image 101 and processes it through each of the layers 103. The output 104 of each layer 103 is a tensor 104 of three dimensions. The dimensions include a height H, a width W and a characteristic C. The tensor 104 may serve as a compact representation of the image 101.

Figure 2:
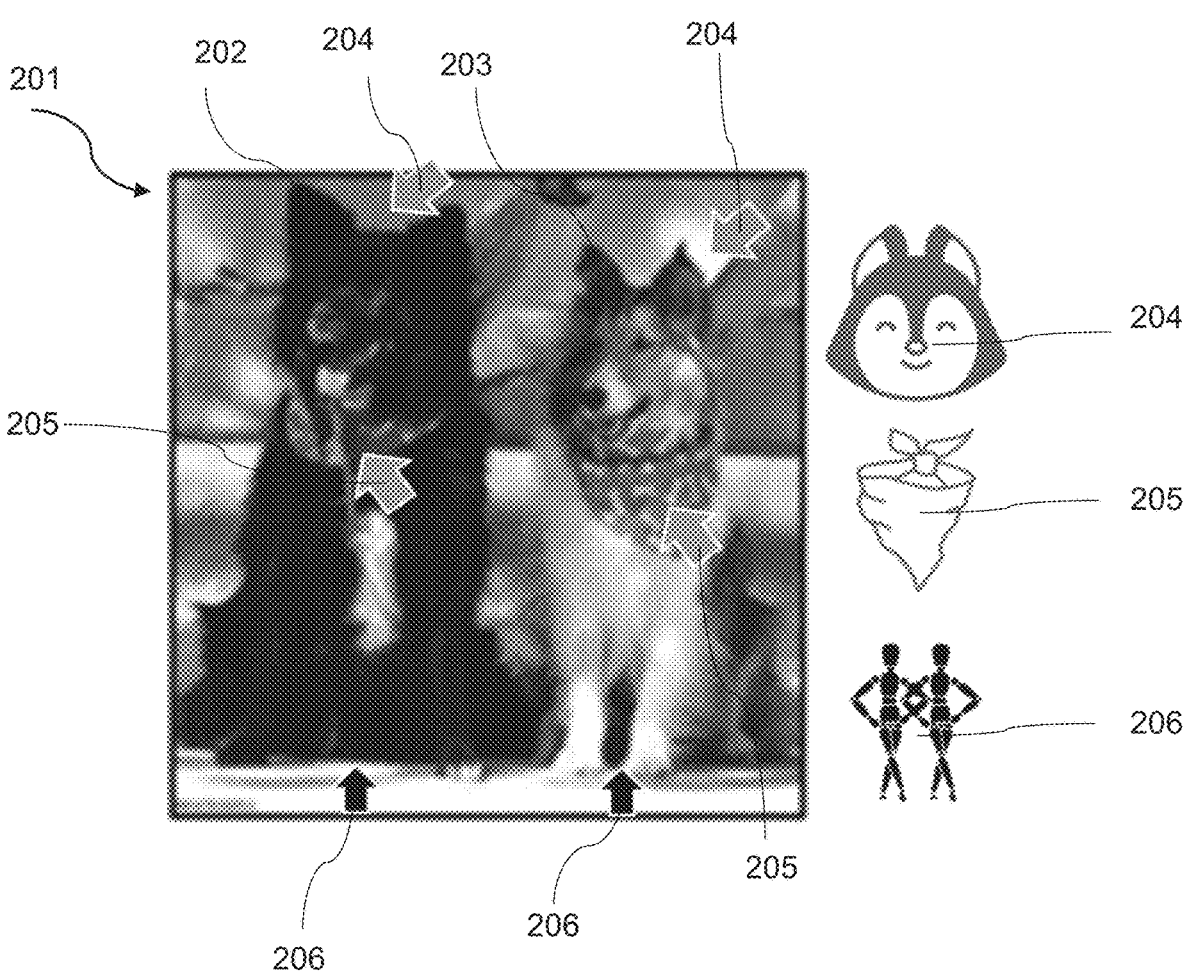
FIG. 2 illustrates an example of an input image, including articles and features, that may be used by an image classification apparatus.

FIG. 2 shows an example of an input image 201 for the allocation apparatus. The image 201 may be a raw image for the image allocation apparatus, or it may be a training image or a truth image for training the image classification model.

The image 201 may comprise a range of articles 202, 203. In the image 201 shown in FIG. 2, the articles 202, 203 comprise a first dog 202 and a second dog 203. The articles 202, 203 may comprise a range of characteristic features 204, 205, 206 which can be used to classify the image 201. In the image 201 shown in FIG. 2, the features 202, 203 comprise the shape of the dog's face 204, the dog's accessories (e.g. a scarf) 205 and the dog's pose 206. Any of these features may be used by the classification apparatus or to train the classification model. It can be appreciated that the articles 202, 203 and features 204, 205, 206 described above are specific to the specific image 201. A range of articles 202, 203 and features 204, 205, 206 may suitable for different types of images and classification requirements. For example, it may be possible to classify other animals or food types and so on.

The convolutional operations are building blocks that process one local neighbourhood at a time, thus in traditional implementations, long-range dependencies can only be captured when these operations are applied repeatedly. This comes with several limitations such as computational inefficiency and optimization difficulties. To deal with that, embodiments of the present disclosure may directly compute spatial-interactions in the input in an efficient way.

A goal is to extract spatial independencies from the input data without the need to compute computationally expensive pairwise interactions which use matrix multiplication and are not suitable for real-time applications. Instead, embodiments of the present disclosure may use global descriptors (406 in FIG. 4) and element-wise multiplication to capture the spatial interactions and project them to the input. This may result in a computation in the first order ($O(h^1w^1)$).

To deal with the efficiency problem of the prior art, embodiments of the disclosure may extract spatial-similarities indirectly, through the use of global descriptors, learnable parameters, and Hadamard product (i.e. element-wise multiplications). The element-wise multiplications may allow an efficient projection of the extracted-information to the input.

An embodiment of the disclosure is further described with reference to FIGS. 3 and 4 below.

Figure 3:
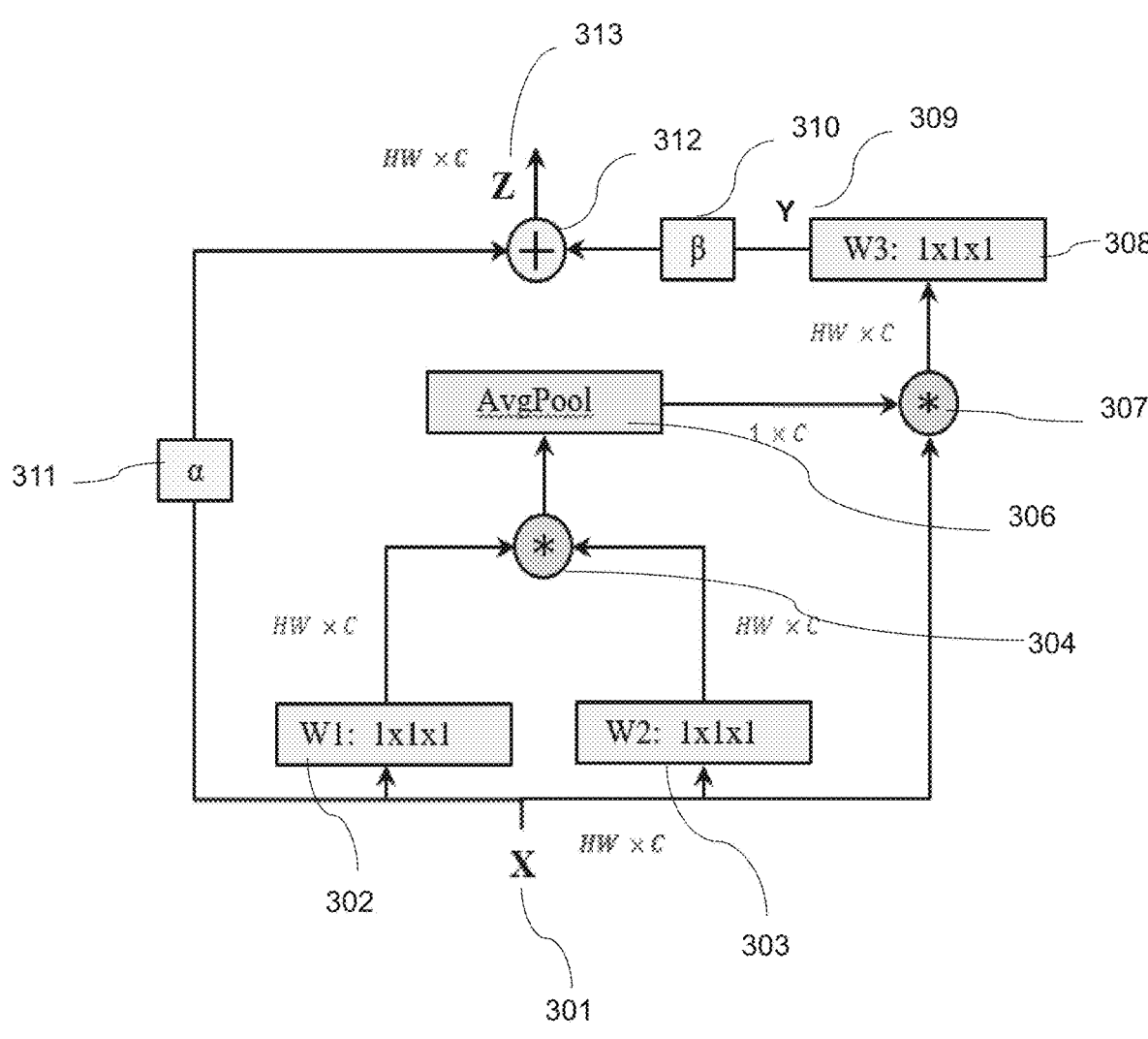
FIG. 3 schematically illustrates an exemplary network architecture used in the image classification apparatus.

FIG. 3 schematically illustrates an exemplary network architecture used in the image classification apparatus. FIG. 4 schematically illustrates an example of the stages the input tensor may undergo in the image classification apparatus.

The specifics of the operation of the image allocation apparatus are described below.

The apparatus receives an input image. For the image allocation apparatus, the input image may be a raw image that is to be allocated by the image allocation apparatus. As mentioned above, the raw image may comprise articles 202, 203 and features 204, 205, 206 used for the classification.

From the raw input image, a plurality of raw image tensors 301, 401 are generated. The input tensors 301 are represented by X in FIG. 3. The raw image tensors 401 are illustrated in more detail in FIG. 4 and comprise the spatial values height (H) 402 and width (W) 403 and a characteristic value (C) 404. The spatial values H 402 and W 403 may represent a coordinate position of a pixel on the input image. The spatial values 402 or 403 may comprise more than two values, for example for use on 3D images. C 404 may represent a colour, greyscale or other image characteristic which provides the articles 202, 203 and features 204, 205, 206 used for the classification. Preferably C 404 represents a colour.

From the input tensor 301, a plurality of raw image matrices 302, 303 are generated. The plurality of raw image tensors 401 are unfolded to generate the plurality of raw image matrices 302, 303. Each of the raw image matrices 302 may correspond to a raw image tensor 401.

Figure 4:
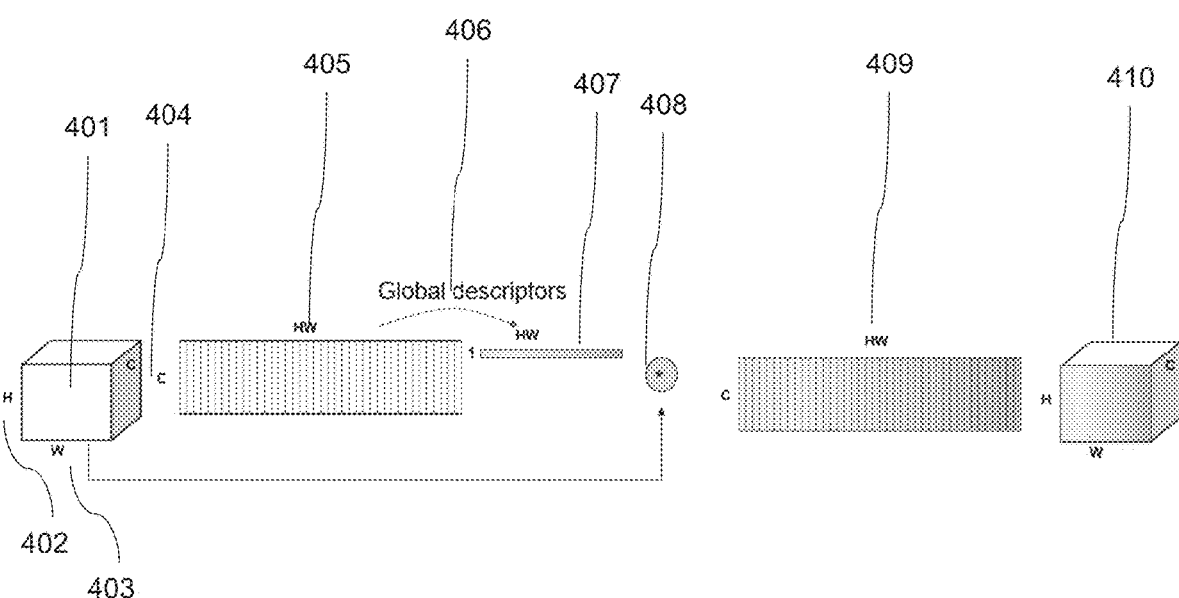
FIG. 4 schematically illustrates the stages the input tensor may undergo in the image classification apparatus.

As illustrated in FIG. 4, the raw image matrix 405 preferably takes the form of a (HW×C) 2D dimensional matrix. The raw image matrix 405 preferably comprises only one spatial value HW and one characteristic value C. There may be more than one characteristic value C. Global descriptors 406 may also be used to convert the HW×C matrix 405 into a (HW×1) matrix 407.

The input raw image matrix 401 is extracted and projected twice into two separate matrices (W1) 302 and (W2) 303, as shown in FIG. 3.

The two raw image matrices (W1) 302 and (W2) 303 are multiplied through element-wise matrix multiplication 304, 408.

The element-wise matrix multiplication 304, 308 is preferably down-sampled through an average pooling operation 306. The down-sampling may also be carried out using a max pooling operation. This operation extracts a summary of characteristic (1×C) across all locations (HW) of the matrices of the image 501.

The summary of the characteristic (1×C) is copied by (HW) times and element-wise multiplied 307 with the input matrix (HW×C) 405 to generate a matrix of parameters (W3) 308. This produces the self-attention output Y 309.

The self-attention output Y 309 is mixed 312 with the input matrix (HW×C) 405 to produce the output Z 312. The output Z is computed using two scalars alpha 311 and beta 309 which weight the contribution of the input matrix (HW×C) 405 and the self-attention output Y 309. This compares the raw matrices with the image classification model.

When training the image classification model used in the image classification apparatus, the apparatus receives a training image and generates a plurality of training matrices from the training image in the manner described above. Each of the plurality of training matrices is formed of one spatial value and one characteristic value. The image classification model is adapted in dependence on the plurality of training matrices.

The training image may comprise articles and features used for the classification (such as the articles 202, 203 and features 204, 205, 206 shown in FIG. 2). The training apparatus may also receive a truth image which may be used to train the model.

From the training image, a plurality of training image tensors are generated. The training image tensors are similar to those illustrated at 401 in FIG. 4 and comprise the spatial values height (H) and width (W) and a characteristic value (C). H and W may represent a coordinate position of a pixel on the image. The spatial values may comprise more than two values, for example for use on 3D images. C may represent a colour, greyscale or other image characteristic which provides the articles and features used for the classification. Preferably C represents a colour.

From the training tensors, a plurality of training image matrices are generated. The plurality of training image tensors are unfolded to generate the plurality of training image matrices. Each of the training image matrices may correspond to a training image tensor. The training image matrix preferably takes the form of a (HW×C) 2D dimensional matrix. The training image matrix preferably comprises only one spatial value HW and one characteristic value C. There may be more than one characteristic value C. Global descriptors may also be used to convert the HW×C matrix into a (HW×1) matrix.

The input training image matrix is extracted and projected twice into two separate matrices (W1) 302 and (W2).

The two training image matrices (W1) and (W2) are multiplied through element-wise matrix multiplication.

The element-wise matrix multiplication is preferably down-sampled through an average pooling operation. The down-sampling may also be carried out using a max pooling operation. This operation extracts a summary of characteristic (1×C) across all locations (HW) of the matrices of the training image.

The summary of the characteristic (1×C) is copied by (HW) times and element-wise multiplied with the input matrix (HW×C) to generate a matrix of parameters (W3). This produces the self-attention output Y.

The self-attention output Y is mixed with the input matrix (HW×C) to produce the output Z. The output Z is computed using two scalars alpha and beta which weight the contribution of the input matrix (HW×C) 405 and the self-attention output Y.

Once the training image has both passed through the above stages, the apparatus compares the difference between the output from the training image to the truth image. The difference may form an error which is then back propagated through the apparatus from the output to the input through input gradients. The weights alpha and beta may be updated to reduce the error.

The training process may iterate using a large collection of images until the weights converge. Once the mode; is trained, it can be applied to the classification apparatus above.

The output Y shown in FIG. 3 may be represented by Equation (1). AvgPool is the average pool function 306, X is the input tensor 301, W1 and W2 are the separate matrices 302, 303, * is the element-wise multiplication 304 and W3 is the matrix of parameters 308.

$$Y=[[\text{AvgPool}(XW_1 * XW_2)]*]W_3 \qquad (1)$$

The $XW_1 * XW_2$ part of Equation (1) provides the element-wise multiplication (or Hadamard product). In embodiments of the present disclosure the W1 302 and W2 303 matrices comprise only one spatial value HW and one characteristic value C. There may be more than one characteristic value C. The result of this is that the multiplication is of a first order $(O(h^1 w^1))$ with respect to the number of spatial positions, which may reduce the computational cost.

Figure 5:
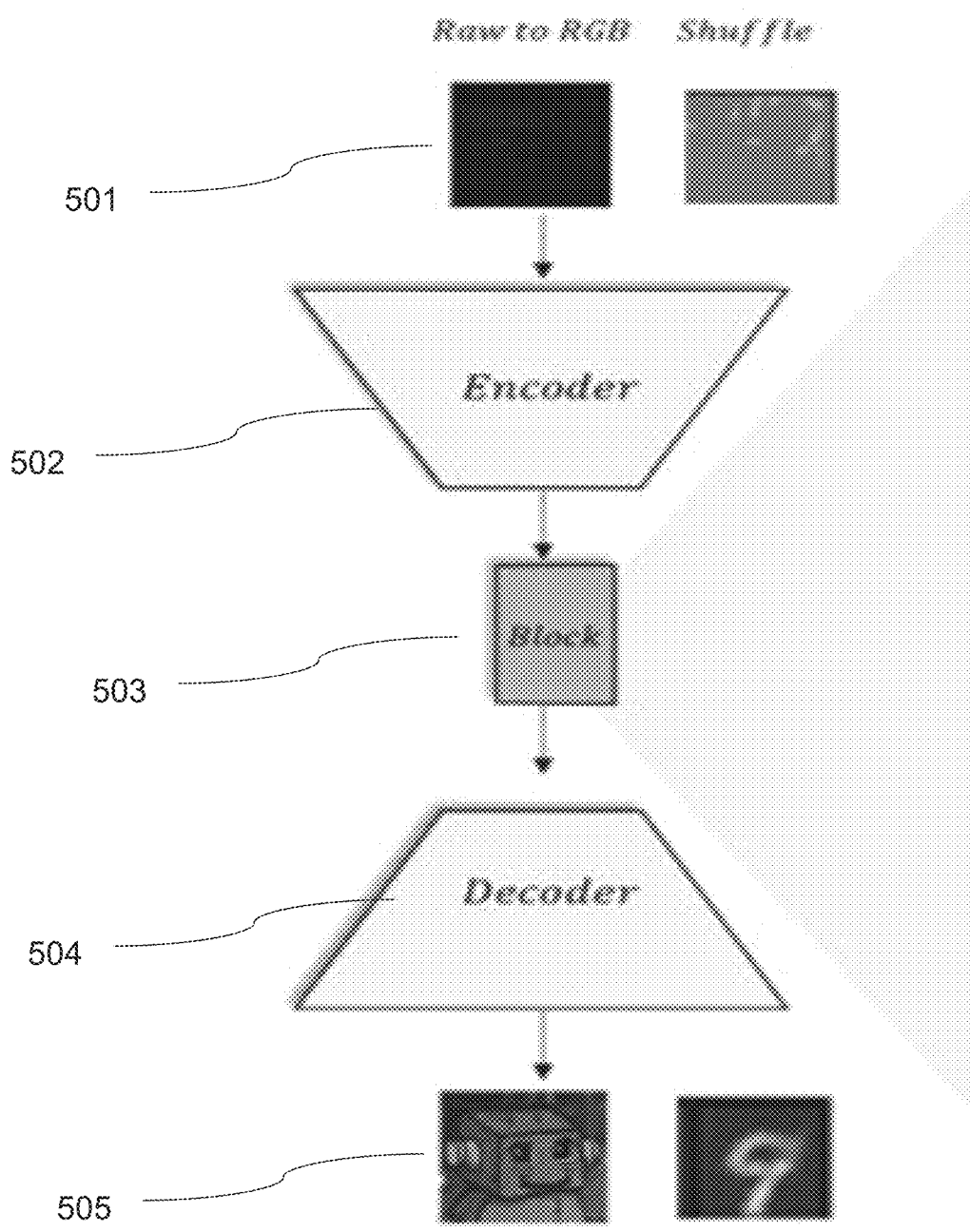
FIG. 5 schematically illustrates an exemplary high-level structure of the network architecture used in the image classification apparatus.

FIG. 5 illustrates an example of a high level structure of the network used in the embodiments shown in FIGS. 3 and 4. The network shown in FIG. 5 further comprises an encoder 502 and a decoder 504.

The encoder 502 receives the input image 501 and generates the tensors 401 as described above. The input tensor X 301 is a 3D tensor representation of a 2D input image 501. It is extracted using a CNN module (i.e "encoder") 502.

The block 503, shown in FIG. 5, may include the network architecture as described in relation to FIGS. 3 and 4. The self-attention block 503 takes X 301 as an input and outputs its enriched representation.

The decoder 504 receives the output from the block 503 and generates a higher quality output image 505.

Figures 6A, 6B:
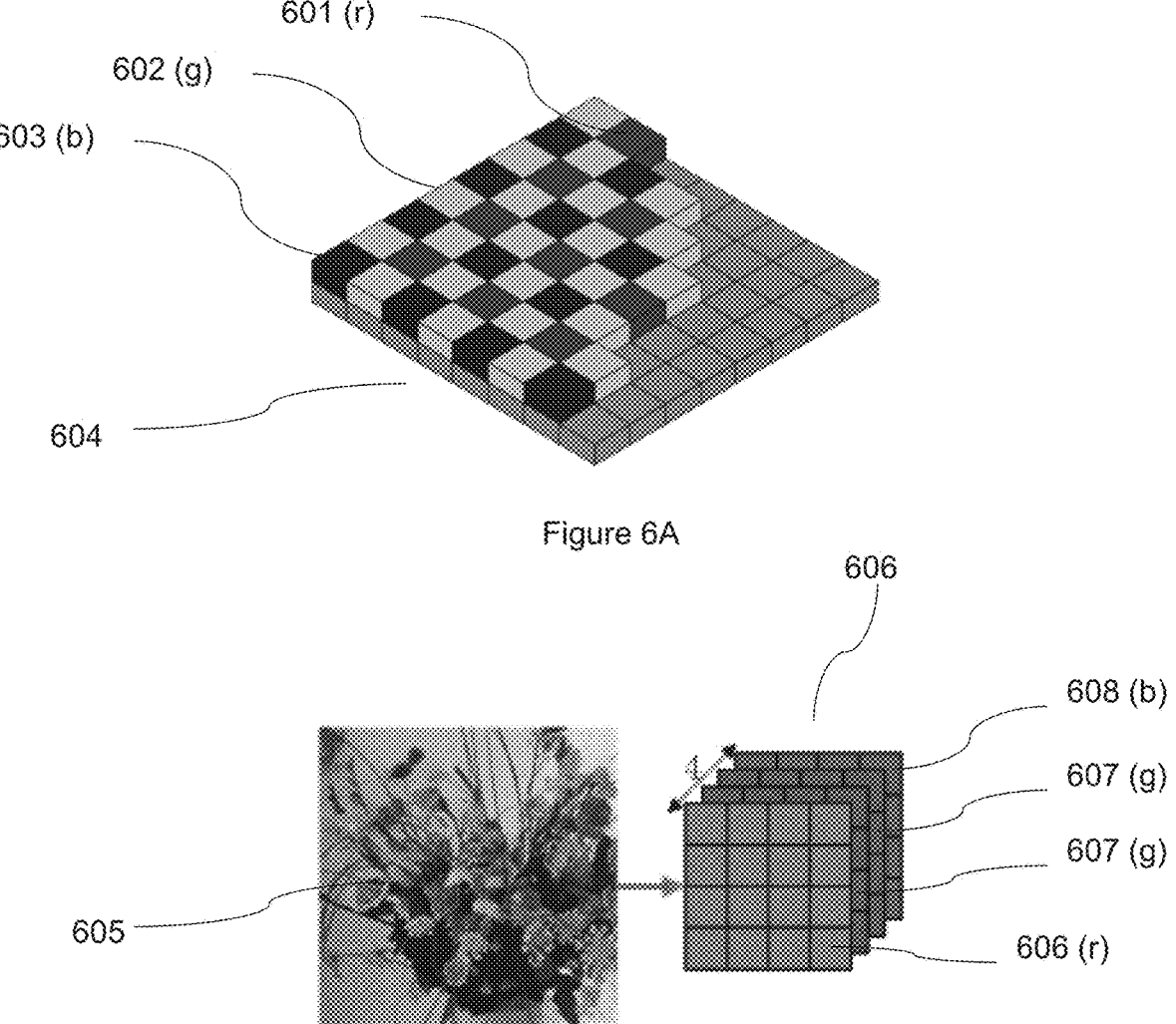
FIG. 6A illustrates an example of a pattern colour filter array.
FIG. 6B illustrates an example of an image converted into colour channels.

The image classification apparatus and the image classification training apparatus receive raw data, such as data in the form of an input image 501. The raw data may be converted using a colour filter array (CFA) that captures the light of specific colours at each pixel. This is shown in FIG. 6A by the known Bayer pattern. The CFA is shown at 604. The pattern has a recurring 2×2 mosaic that is tiled across the image. The 2×2 mosaic includes a red colour 601, two green colours 602 and a blue colour 603. Preferably the raw data captured has a large dynamic range, for example, 10 bit data which can represent 1024 different levels at each red 601, green 601, or blue colour 603. An image captured in this format is said to be mosaicked.

Embodiments of the present disclosure preferably use a CNN to process the mosaicked image. The CNN may learn a collection of filters, which are applied to the image through convolution. The convolution is designed to be spatially invariant, meaning the convolution has the same effect when applied to any location in the image. A potential problem however with applying convolutions on the mosaicked image is that the convolutions are no longer spatially invariant, as a result of the CFA. For example, when the filter is centred on a blue pixel, it may have a different effect than when centred on a red pixel. A simple way to address this issue is to pack the data into like-colour channels, each of which can then be processed in the CNN using spatially invariant convolutions. Both stages received as input a packed RAW.

FIG. 6B shows the mosaicked image 605 packed into four colour channels 606 representing the red 606, two green 607 and blue 608 colours. In the packed form, the spatial resolution of each colour channel is half of the original image resolution. The packed form is preferable as it may allow the CNN to process the image using spatially invariant convolutions.

Figure 7:
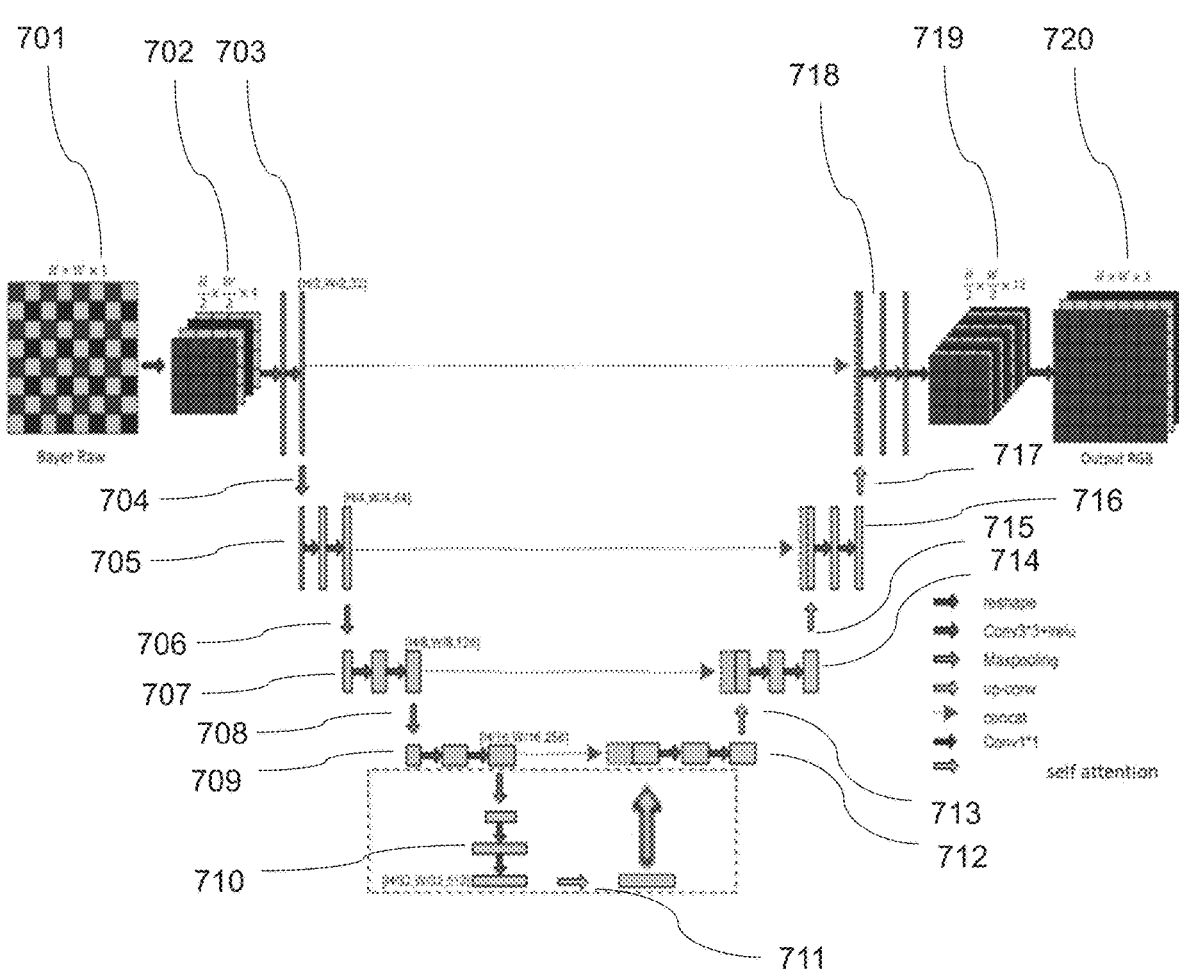
FIG. 7 schematically illustrates an exemplary detailed structure of the network architecture used in the image classification apparatus.

A detailed illustration of the preferred embodiment of the network architecture is illustrated in FIG. 7. This network takes a raw single channel input 701, which is then processed with a Unet. This is a "fully convolutional" network which uses an encoder-decoder architecture with skip connections. Between the encoder and the decoder part of the network, the self-attention block integrates information about self-similarity. This is depicted by the arrow 708.

The encoder part of the apparatus, illustrated by 703 to 709, processes the raw input with five consecutive layers 703, 705, 707, 709, 710. Each layer applies to its input two banks of 3×3 convolutional filters (together with a ReLU activation function) and one "Max Pooling" operation 704, 706, 708. The first convolution 702 increases the number of filters (i.e. channels) by a factor of two. The Max Pooling operation reduces the spatial image resolution by a factor of two (i.e. from H, W, C to H/2, W/2, C). The image is processed at multiple scales and the network adapts to different frequency content. This produces output channels that capture features inherent in the data and relevant to the luminance estimation task.

As mentioned above, the self-attention module 711 is used to compute self-attention on the input tensor 301. It takes as input the encoder-features (H/32, W/32, 512) 709 and produce as output a matrix 712 with the same dimensionality.

The decoder part of the apparatus, illustrated by 712 to 718 processes the output 712 of the "self-attention block" 711 with four consecutive layers 712, 714, 716, 718 of two banks of 3×3 convolutional filters and a Transposed Convolution operation 713, 714, 717. The Transposed Convolution 713, 714, 717 is an upsampling layer which increases the spatial resolution by a factor of two in each dimension (width and height) and decreases the number of filters by a factor of two. The input to each layer is a concatenation of i) the high resolution features from the encoding part related to the same spatial resolution and ii) the output of the previous decoding layer (i.e. spatially up-sampled features). The two subsequent convolutions learn to assemble a more precise output based on the concatenated input.

During training of the image classification apparatus, the apparatus learns the convolutional filters. This is done using training pairs, each comprising a training image and a reference image, which is used as ground truth (GT) truth image. Initially, the convolutional filters are set to random values. The mosaicked image 701 is input into the network, and the network regresses an output image 720. The difference between the regressed output image and the GT image forms an error, which is then back-propagated through the network from the output to the input though gradients, or other input conditions. The weights of the network are then updated to reduce the error. The training process iterates using a large collection of images 701 until the network weights converge. Once the network is trained, it can be applied to raw input 701 to recover its RGB channels.

Figure 8:
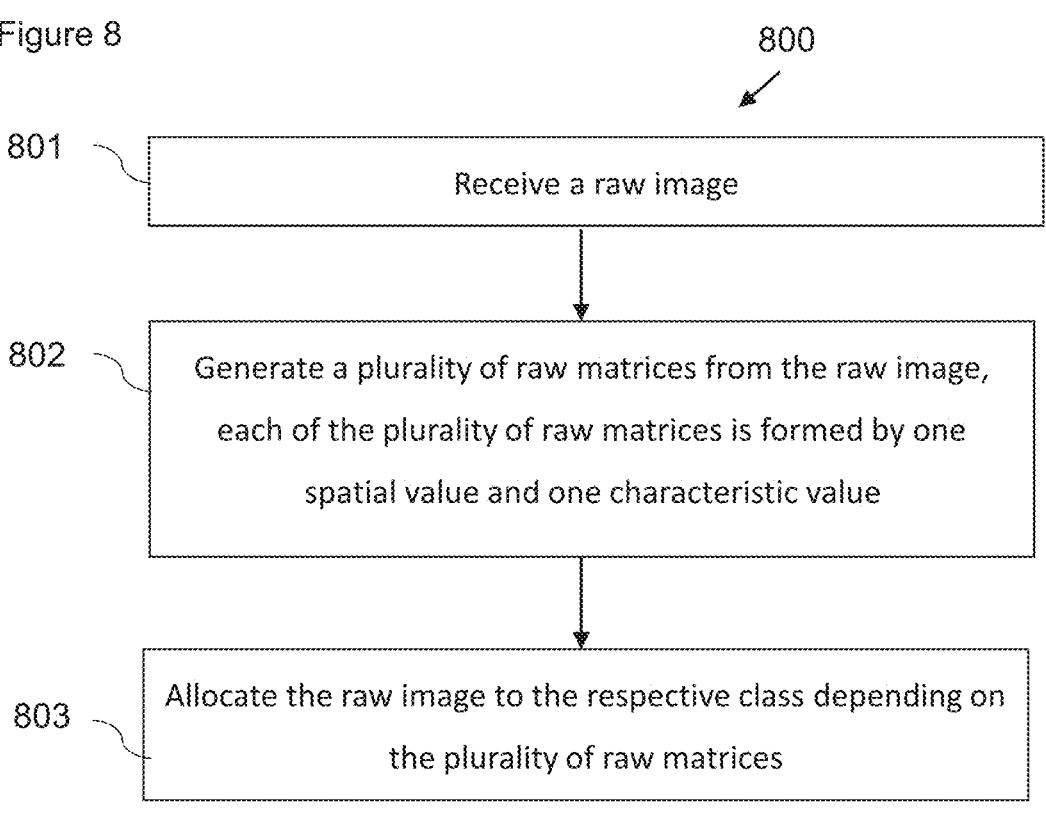
FIG. 8 shows an example of a method for allocating a raw image.

FIG. 8 summarises an example of a method for allocating a raw image to a respective class out of a plurality of classes. At step 801, the method comprises receiving a raw image. At step 802, the method comprises generating a plurality of raw matrices from the raw image, each of the plurality of raw matrices is formed by one spatial value and one characteristic value. At step 803, the method comprises allocating the raw image to the respective class depending on the plurality of raw matrices.

A method for training an image classification model used in the above allocation method may comprise the steps of receiving a training image, generating a plurality of training matrices from the training image, each of the plurality of training matrices being formed of one spatial value and one characteristic value and adapting the image classification model in dependence on the plurality of training matrices.

Figure 9:
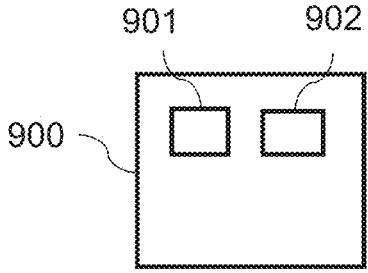
FIG. 9 shows an example of an apparatus configured to perform the methods described herein.

An example of an apparatus 900 configured to implement the methods described herein is schematically illustrated in FIG. 9. The apparatus 900 may be implemented on an electronic device, such as a laptop, tablet, smart phone or TV.

The apparatus 900 comprises a processor 901 configured to process the datasets in the manner described herein. For example, the processor 901 may be implemented as a computer program running on a programmable device such as a Central Processing Unit (CPU). The apparatus 900 comprises a memory 902 which is arranged to communicate with the processor 901. Memory 902 may be a non-volatile memory. The processor 901 may also comprise a cache (not shown in FIG. 9), which may be used to temporarily store data from memory 902. The apparatus may comprise more than one processor and more than one memory. The memory may store data that is executable by the processor. The processor may be configured to operate in accordance with a computer program stored in non-transitory form on a machine readable storage medium. The computer program may store instructions for causing the processor to perform its methods in the manner described herein.

Specifically, the classification apparatus may comprise one or more processors, such as processor 901, and a memory 902 storing in non-transient form data defining program code executable by the processor(s) to implement an image classification model. The image classification apparatus may receive a raw image. The image classification apparatus may generate a plurality of raw matrices from the raw image, each of the plurality of raw matrices is formed by one spatial value and one characteristic value. The degraded image may be allocated by means of the image classification model depending on the plurality of raw matrices.

The apparatus 900 may also be used to train an image classification model as described above. The classification training apparatus may comprise one or more processors, such as processor 901, and a memory 902. The classification training apparatus may receive a training image. The classification training apparatus may generate a plurality of training matrices from the training image, each of the plurality of training matrices is formed of one spatial value and one characteristic value. The classification training apparatus may adapt the image classification model in dependence on the plurality of training matrices.

The apparatus 900 may also be used for processing a raw image. The image processing apparatus may comprise one or more processors, such as processor 901, and a memory 902. The image processing apparatus may transform a raw image in dependence on a class to which the image classification apparatus has allocated the raw image.

As a comparison to the apparatus and method described above, FIGS. 10 and 11 show a prior art apparatus that is disclosed in Wang et al. In this disclosure, the apparatus proposes to capture input's spatial interdependencies via a pairwise function. A pairwise comparison generally is any process of comparing entities in pairs to judge which of each entity is preferred. This comes with a computational cost that scales quadratically with the number of spatial positions, making the application of the original non-local-block module in real-world applications limited. In practice, the scope of this block is tightened to those cases where the input dimension is small or where the network is not bounded by any requirements on efficiency, such as in non-real time applications.

Figure 10:
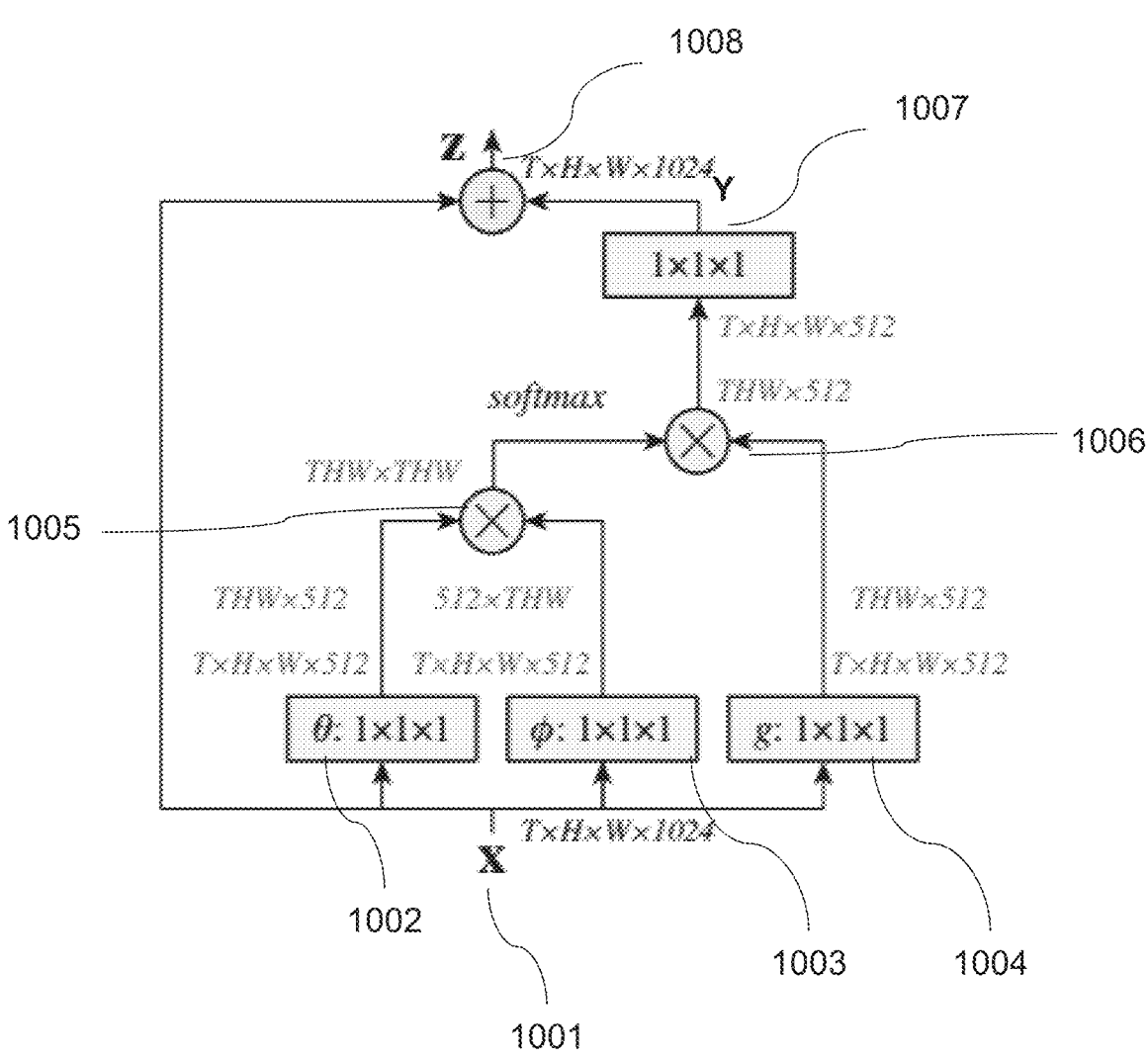
FIG. 10 schematically illustrates a prior art network architecture used in an image classification apparatus.
Figure 11:
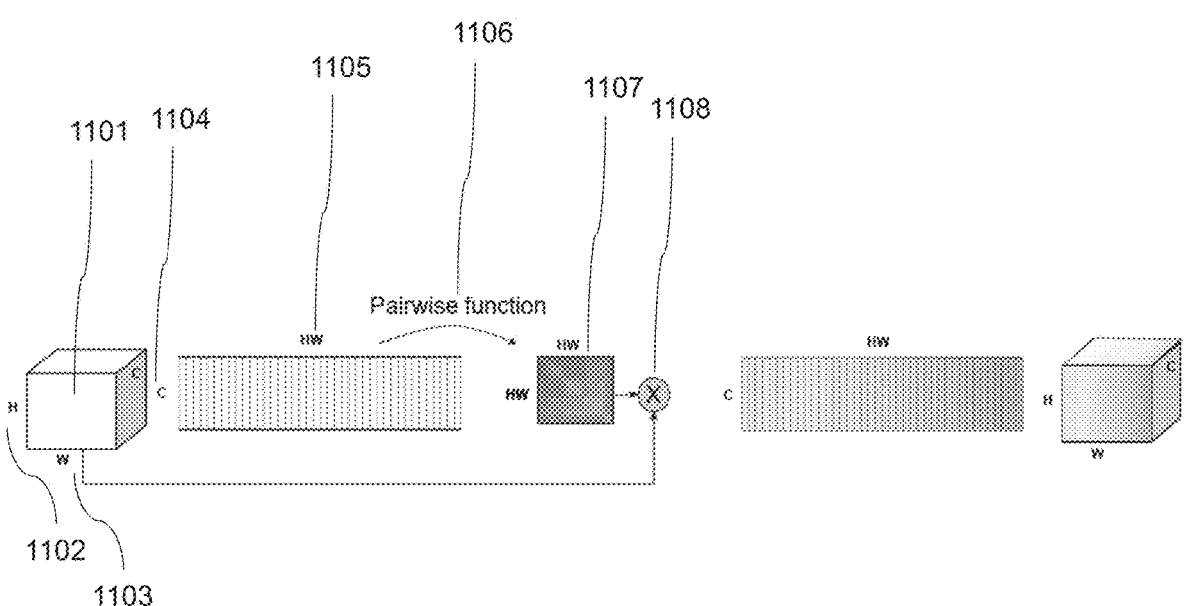
FIG. 11 schematically illustrates the stages the images may undergo in the prior art image classification apparatus.

FIG. 10 schematically illustrates a prior art network architecture used in an image classification apparatus. FIG. 11 schematically illustrates the stages the images may undergo in the prior art image classification apparatus.

The apparatus unfolds the input tensor X 1001, 1101 of dimension H×W×C (height 1102, width 1102, characteristic 1104) into matrices 1002, 1003, 1004, 1105 of dimension HW×C, where each position $hw_i$ is described by its C features. The apparatus applies a pairwise function 1106 to extract the similarity matrix 1007, 1107 (THW×THW).

The goal of non-local-block is to describe spatial position relationships. A key part of the apparatus is to extract the similarity matrix HW×HW 1007, 1107 using the pairwise function 1106. In the similarity matrix 1007, 1107, each $hw_i$ point holds a score between 0 (the darker area of 1107 in FIG. 11) and 1 (the lighter area of 1107 in FIG. 11) expressing how close it is to every other spatial position $hw_j$. The use of a matrix-multiplication 1005, 1006, 1108 allows the apparatus to project the interactions captured by the similarity matrix 1007, 1107 from original input tensor 1001, 1101. Since the method has to compare each possible couple of items $hw_i$ and $hw_j$ the computational cost scales quadratically with the number of spatial positions. Thus, the multiplication is second order ($O(h^1w^1)$) with respect to the number of spatial positions.

The Y 1007 output may be represented by Equation (2):

$$Y = f(X, X)g(X) = \left(XW_a W_b^T X^T\right)(XW_c) = XW_2 X^T XW_5 \qquad (2)$$

The $$W_a W_b^T$$

part of Equation (2) provides the matrix multiplication.

The output Y 1007 may be combined with the input X 1001, 1101 to form the output Z1008.

Figure 12:
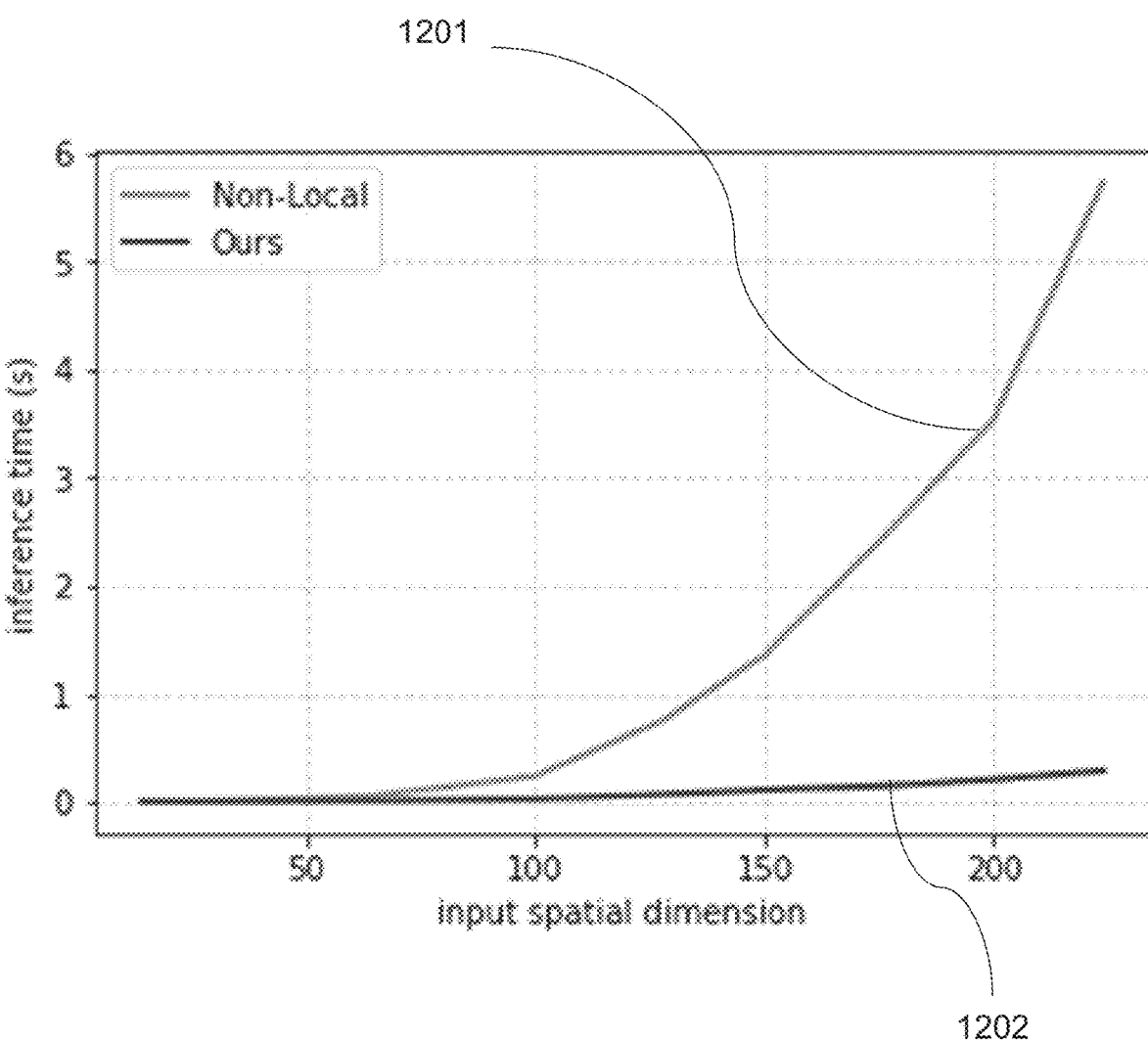
FIG. 12 illustrates the interference time of an embodiment of the present disclosure compared to that of the prior art.

FIG. 12 illustrates the difference in interference time output with respect to the input spatial dimension between an embodiment of the present disclosure and the prior art of Wang et al. The result of the prior art is illustrated by the curve 1201. The result of the embodiment of the present disclosure is illustrated by the curve 1202. The computational run time for this embodiment of the disclosure 1202 scales linearly with number of spatial positions HW. The computational time needed to run the Non-Local-Block of the prior art 1201 scales quadratically with number of spatial positions HW. Thus, embodiments of the disclosure may have an increasing benefit for increase input spatial dimensions.

Figure 13:
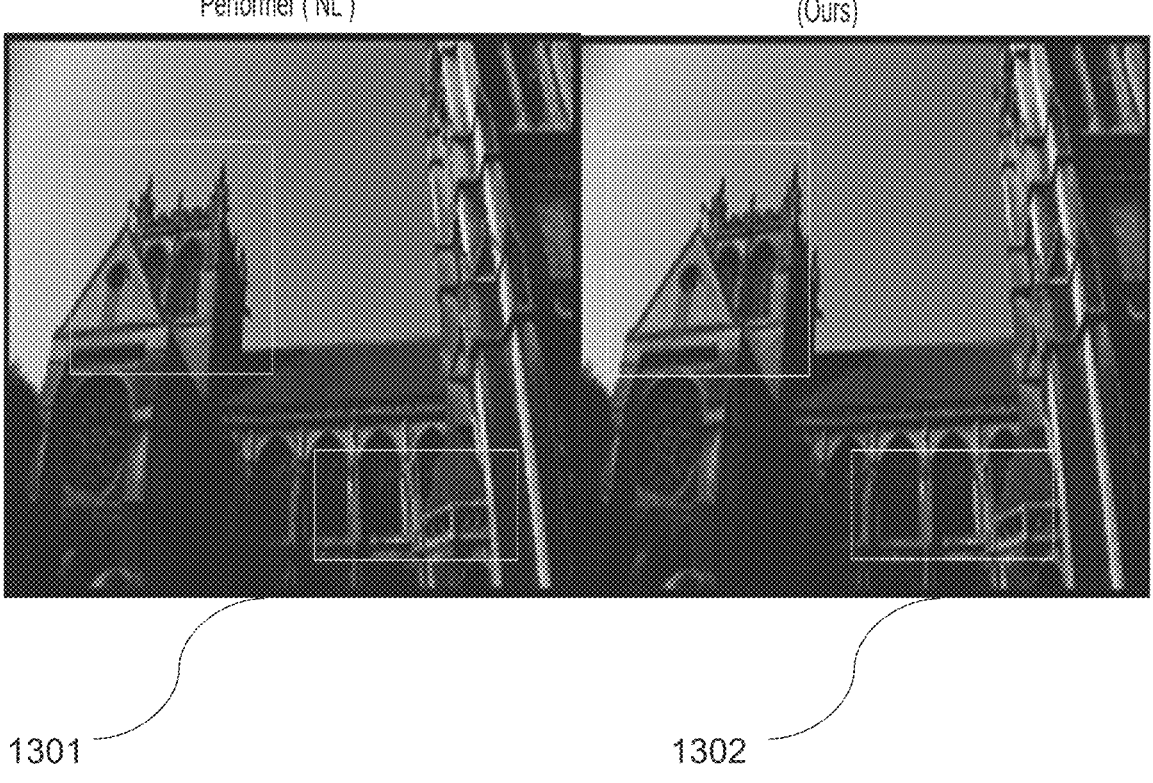
FIG. 13 illustrates the image output of an embodiment of the present disclosure compared to that of the prior art.

FIG. 13 compares results from the output image from the prior art 1301 and the embodiment of the present disclosure 1302. Although the prior art output image 1301 may have good denoising, the image 1302 suffers from demosaicking artifacts. The output image from the embodiment of the present disclosure 1302 estimates sharper edges and more realistic colours compared to the baseline.

The apparatus and method may be practically applied to other data inputs in other fields such as images and videos in relation to computer vision, to corpora of text in relation to natural language processing, to gene expressions in relation to bioinformatics.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present disclosure may consist of any such individual feature or combination of features. In view of the foregoing description it will be evident to a person skilled in the art that various modifications may be made within the scope of the disclosure.

What is claimed:

1. An apparatus for allocating a raw image to a respective class out of a plurality of classes, the apparatus comprising:
   one or more processors; and
   a memory storing program code that, when executed by the one or more processors, causes the apparatus to implement an image classification model including operations comprising:
     receiving a raw image;
     generating a plurality of raw tensors from the raw image, wherein each raw tensor of the plurality of raw tensors comprises two or more spatial values and one characteristic value;
     unfolding each raw tensor of the plurality of raw tensors to generate a plurality of raw matrices from the raw image, wherein each raw matrix of the plurality of raw matrices is formed by one spatial value and one characteristic value; and
     allocating the raw image to the respective class out of the plurality of classes based on the plurality of raw matrices.

2. The apparatus according to claim 1, wherein implementing the image classification model further includes operations comprising:
   allocating the raw image to the respective class out of the plurality of classes based on the plurality of raw matrices by comparing the raw matrices with the image classification model and allocating the raw image to the respective class based on comparing the raw matrices with the image classification model.

3. The apparatus according to claim 2, wherein implementing the image classification model further includes operations comprising:
   comparing the raw matrices with the image classification model by comparing an error difference between the raw matrices and the image classification model and allocating the raw image to the respective class based on comparing the error difference between the raw matrices and the image classification model.

4. The apparatus according to claim 2, wherein implementing the image classification model further includes operations comprising:
   comparing the raw matrices with the image classification model by a convolutional neural network.

5. The apparatus according to claim 2, wherein implementing the image classification model further includes operations comprising:
   comparing the raw matrices with the image classification model by a self-attention weighting operation.

6. The apparatus according to claim 2, wherein implementing the image classification model further includes operations comprising:
   comparing the raw matrices with the image classification model by an average pooling down-sampling operation.

7. The apparatus according to claim 2, wherein implementing the image classification model further includes operations comprising:
   comparing the raw matrices with the image classification model by a max pooling down-sampling operation.

8. The apparatus according to claim 1, wherein the spatial values in the plurality of raw matrices represent a coordinate position of the raw image.

9. The apparatus according to claim 1, wherein characteristic values of the plurality of raw matrices represent colour values of the raw image.

10. A method for allocating a raw image to a respective class out of a plurality of classes, the method comprising:
    receiving a raw image;
    generating a plurality of raw tensors from the raw image, wherein each raw tensor of the plurality of raw tensors comprises two or more spatial values and one characteristic value;
    unfolding each raw tensor of the plurality of raw tensors to generate a plurality of raw matrices from the raw image, wherein each raw matrix of the plurality of raw matrices is formed by one spatial value and one characteristic value; and
    allocating the raw image the respective class out of the plurality of classes based on the plurality of raw matrices.

11. The method according to claim 10, further comprising:
    allocating the raw image to the respective class out of the plurality of classes based on the plurality of raw matrices by comparing the raw matrices with the image classification model and allocating the raw image to the respective class based on comparing the raw matrices with the image classification model.

12. An apparatus for training an image classification model, the apparatus comprising one or more processors configured to:
    receive a training image;
    generate a plurality of training tensors from the training image, wherein each training tensor the plurality of training tensors comprises two or more spatial values and one characteristic value;
    unfold each training tensor of the plurality of training tensors to generate a plurality of training matrices from the training image, wherein each training matrix of the plurality of training matrices is formed of one spatial value and one characteristic value; and
    adapt the image classification model based on the plurality of training matrices.

13. The apparatus according to claim 12, wherein the one or more processors are further configured to:
    before adapting the image classification model, receive a truth image corresponding to the training image; and generate a plurality of truth matrices from the truth image, wherein each truth matrix of the plurality of truth matrices has one spatial value and one characteristic value.

14. The apparatus according to claim 13, wherein the one or more processors are further configured to:

before generating the plurality of truth matrices, generate a plurality of truth tensors from the truth image, wherein each truth tensor of the plurality of truth tensors comprises two or more spatial values and one characteristic value; and unfold each truth tensor of the plurality of truth tensors to generate the plurality of truth matrices.

15. The apparatus according to claim 13, wherein the one or more processors are further configured to:

adapt the image classification model based on the plurality of training matrices by comparing the training matrices with the truth matrices and adapting the image classification model based on comparing the training matrices with the truth matrices.

16. The apparatus according to claim 12, wherein the one or more processors are further configured to;

carry out the steps of claim 12 for one or more subsequent training images, wherein each subsequent training image of the one or more subsequent training images comprises an input for a subsequent training iteration of the image classification model.

17. The apparatus according to claim 16, wherein the one or more processors are further configured to;

carry out the steps claim 14 for one or more subsequent truth images, wherein the one or more subsequent truth images correspond to the one or more subsequent training images, and wherein the one or more subsequent truth images provide a subsequent truth iteration.

18. The apparatus according to claim 17, wherein the one or more processors are further configured to:

provide one or more input conditions of a subsequent training iteration, wherein the one or more input conditions are dependent on a difference between preceding training matrices and preceding truth matrices.

19. A method for training an image classification model, the method comprising:

receiving a training image;

generating a plurality of training tensors from the training image, wherein each training tensor the plurality of training tensors comprises two or more spatial values and one characteristic value;

unfolding each training tensor of the plurality of training tensors to generate a plurality of training matrices from the training image, wherein each training matrix of the plurality of training matrices is formed of one spatial value and one characteristic value; and adapting the image classification model based on the plurality of training matrices.

20. The method according to claim 19, further comprising:

before adapting the image classification model, receiving a truth image corresponding to the training image; and generating a plurality of truth matrices from the truth image, wherein each truth matrix of the plurality of truth matrices has one spatial value and one characteristic value.

\* \* \* \* \*